July 24, 1923.                 J. W. SWAN                    1,462,725
                            CARBURETOR CONTROL
                           Filed Aug. 26, 1919
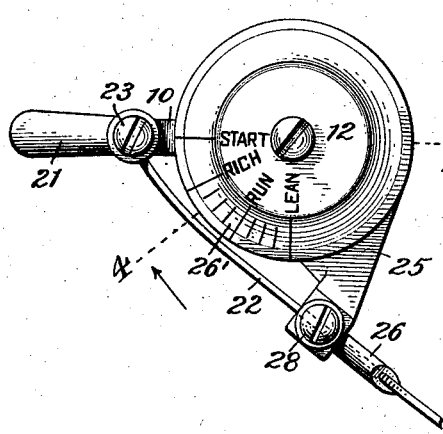
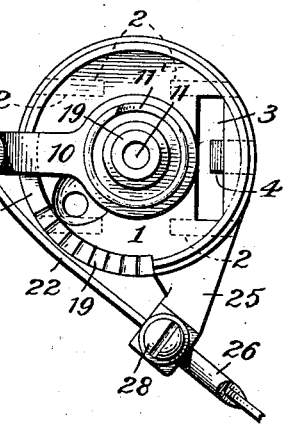
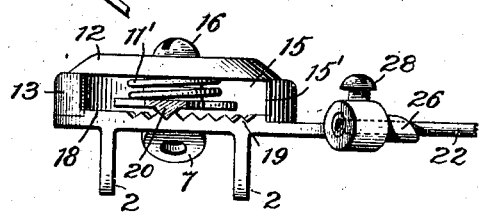
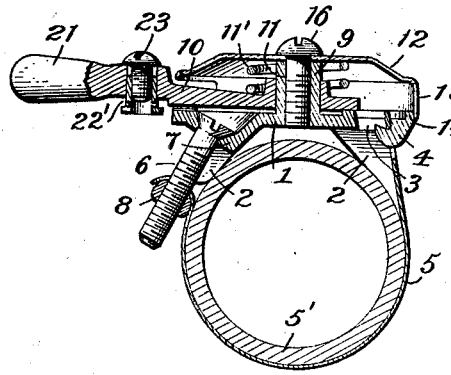
Witness:
Jas. E. Hutchinson
Inventor
John W. Swan,
By
Milans & Milans Attorneys Patented July 24, 1923.

1,462,725

UNITED STATES PATENT OFFICE.

JOHN W. SWAN, OF STAMFORD, CONNECTICUT.

CARBURETOR CONTROL.

Application filed August 26, 1919. Serial No. 319,878.

*To all whom it may concern:*

Be it known that I, JOHN W. SWAN, a citizen of the United States, residing at Stamford, in the county of Fairfield and State of Connecticut, have invented certain new and useful Improvements in Carburetor Controls, of which the following is a specification, reference being had therein to the accompanying drawing.

The invention relates to improvements in a control device.

It is an object of the invention to provide a control device that may be rigidly applied to the steering column of a motor vehicle, having a shiftable lever portion operatively associated with the gasolene feed of a carburetor, for controlling and varying at the will of the operator the quantity of gasolene admitted to the carburetor or manifold of the engine.

It is a further object of the invention to provide a device of this character which may be applied to any steering column now in use, and positioned so as to be easily accessible to the driver, whereby the quantity of fuel admitted to the engine is under instant control and may be changed from time to time so as to permit substantially raw gasolene to enter the manifold when starting, and to regulate the mixture to the desired ratio of air and gas when the engine is under way.

It is a still further object of the invention to provide a device of this character which is simple in construction, embodying a minimum number of parts and is inexpensive to manufacture, yet being highly efficient in operation.

The invention in a more specific aspect comprises a device that is primarily intended for application to the steering column of a motor vehicle, and has its base or bottom portion formed with outwardly extending lugs having bevelled surfaces along one side to adapt the device to steering columns of different sizes causing a rigid connection therewith upon the tightening of the attaching band encircling the steering column. The base of the device is provided with a series of upstanding teeth disposed for a portion of the distance therearound, and pivoted to the base and movable over the teeth is the operating lever connected with the fuel supplying means. The base is provided with a cover plate being graduated for a portion of the distance therearound and adjacent certain of the graduations are suitable indicating characters to designate when the lever is registered with these characters approximately the quantity of gasolene being admitted to the engine. The lever is formed with a depending pawl to cooperate with the teeth on the base so as to be maintained in its different positions of adjustment until engaged and manually moved by the operator.

In the accompanying drawings I have shown the preferred embodiment of the invention, but it will, of course, be understood that the same is subject to many changes in combination, modification and arrangement of the parts.

In the drawings:

Figure 1 is a top plan view.

Figure 2 is a similar view with cover removed.

Figure 3 is a side elevation with parts in section.

Figure 4 is a sectional view on line 4—4 Figure 1 looking in direction of the arrows.

Referring now more particularly to the drawings wherein like reference characters indicate corresponding parts, the numeral 1 designates a base which is of a substantially flat formation, having projecting from its under face a plurality of projections 2, the inner faces of which are bevelled and adapted to engage a steering column when the device is applied thereto. The base of the device is also formed with a transverse slot 3 therein disposed between the projections 2 at one side thereof, and extending into this slot is a hook member 4 that is shown as being integral with the base of the device and constitutes a means for attaching one end of the band 5 encircling the column 5' to the base, that is used for securing the device upon the column. Between the opposite lugs or wedge shaped members 2, the base is formed with a depression adapted to receive the head of the threaded adjusting screw 6, the threaded portion of said screw passing through an aperture in an offset part 7 of the base and receiving an adjustable nut 8 by means of which the base is firmly united to the steering column, it being manifest that an adjustment of the screw serves to draw the base tightly to the column.

The base is formed at its center with a central upstanding hollow standard 9, being interiorly threaded at one end and surrounding the upstanding part is the operating handle 10 having a suitable aperture 11 therein to receive said upstanding part 9 being widened around its apertured part to form a seat for the coil spring 11' disposed upon the handle and engaging at its opposite end the under side of the cover plate 12. The plate is formed with a downturned flange 13 seated upon the base 1 and resting against an upturned or annular rim portion 14 extending entirely therearound save for the serrated portion of the base which will be later described.

The cover 12 is cut away as at 15 and around a portion of its periphery providing a socket 15', and when the cover is applied to the base, the same is united thereto by a fastening screw 16 cooperating with the upstanding standard 9 of the base, the cover being centered upon the base by an engagement of the side walls of the socket portion 15' with the ends of the slightly raised or upstanding part 18 of the base extending within the socket portion 15' of the cover having a plurality of teeth 19 extending the entire distance between the sides of the side walls of the socket 15' of the cover, and it will be seen that the operating handle 10 moves within the space provided by cutting away the portion of the cover to provide the socket 15'. This operating lever is normally urged downwardly by the spring 11, and along its under side carries a pawl 20 cooperating with the teeth 19 of the base so that when the same is manually adjusted the tension of the spring 11' urges the pawl into relation with the ratchet 19 to prevent an accidental movement of the lever. The lever has a hand portion 21 extending beyond the sides of the device, and projecting through this handle is a sleeve 22' having an opening therein to receive the valve operating wire 22, the wire being held to the handle by adjusting the set screw 23 entering a threaded bore in the sleeve, it being manifest that an adjustment of the screw will draw the sleeve toward the under side of the handle and tightly bind the wire therewith, so that a movement of the lever will cause a complemental movement of the wire.

The base is provided with an outstanding portion 25 formed with an opening extending therethrough receiving the wire guide 26 through which the wire 22 passes, this guide extending to the carburetor of an engine and being held to the base of the device by the adjustment of the fastening screw 28 passing through a threaded bore therein.

The cover plate is formed with a plurality of graduations 26' disposed upon its face, and in alignment with said graduations are suitable indicating characters, for instance, the words, Start, Rich, Run and Lean that indicate to the operator of the vehicle if the operating lever 10 is brought to a position where it registers with these characters, a definite quantity of gasolene is being permitted to enter the mixing chamber of the carburetor or the engine manifold. For instance, should it be desired to start the engine the operator will know that if the lever is shifted so that it underlies the graduation mark adjacent the characters Start, substantially raw gasolene will be admitted to the engine as a movement of the lever to this position causes the flexible wire 22 to properly shift a valve in the carburetor to admit the gasolene to the manifold. After the engine is running and a rich or lean mixture is needed, then the lever is shifted by the operator until it registers with the proper indicating character, or is disposed between the two indicating characters until the desired ratio of air and gasolene is being admitted to the carburetor to form the required mixture.

When the device is to be applied to a steering column the flexible band 5 is introduced through the opening 3 in the base and engages the hook portion 4 as disclosed in Figure 2, the band being then encircled around the steering column until the aperture in the offset end has received the adjustable fastening screw 6 disposed within the depressed portion of the base, and an adjustment of the nut upon its fastening screw causes the device to be firmly drawn upon the column, it being apparent that the bevelled sides of the projecting parts 2 serve to adapt the device to fit different sized columns and to be firmly united thereto when applied to a column.

Having thus described the invention, what I claim is:—

1. A control device comprising a base, a lever pivotally connected to the base, an adjustable sleeve extending through the lever and having a transversely extending opening therein, a valve operated member having one end extending through the transversely extending opening of the sleeve, and means for adjusting the sleeve to tightly grip the valve operating member against the lever.

2. A controlling device comprising a base, a lever pivotally connected to the base, an adjustable sleeve extending through the lever, a valve operating member connected to the sleeve, and means for adjusting the sleeve to tightly grip the valve operating member.

3. A controlling device comprising a base, a lever pivotally connected to the base, an interiorly threaded sleeve extending through and slidable in the lever, a valve operating member connected to the sleeve, and a screw engaging the threads of the sleeve for sliding the same, the head of said screw overlying the end of the sleeve and engaging the surface of the lever.

4. A control device comprising a base, a standard extending therefrom, a lever pivotally mounted on said standard and connected with a valve operating element, a spring disposed upon said lever and surrounding the standard, a cover portion secured to the base and against which one end of said spring impinges for maintaining the lever in position.

5. A control device comprising a base, a standard extending therefrom, a lever pivotally mounted on said standard and connected with a valve operating element, a spring disposed upon said lever and surrounding the standard, a cover portion secured to the base and against which one end of said spring impinges for maintaining the lever in position, said cover having a plurality of indicating characters thereon, and cooperating means carried by the base and the lever for maintaining the same in its different adjusted positions in registry with said indicating characters.

6. A control device of the character described having a base and a valve operating lever, said base being formed with separated pairs of outwardly projecting lugs having the inner surfaces of each pair fashioned to fit a steering column, the base having a slot between one pair of lugs and a hook projecting across said slot, means for securing the device to a steering column comprising a band for encircling the column, and having a portion entering the slot between said pair of projecting elements and cooperating with the hook on the base, and other means for clamping the opposite end of the band with the other side of the base.

7. A control device of the character described having a base and a valve operating lever, said base being formed with separated pairs of outwardly projecting lugs having the inner surfaces of each pair fashioned to fit a steering column, the base having a slot between one pair of lugs and a hook projecting across said slot, means for securing the device to a steering column comprising a band for encircling the column, and having a portion entering the slot between said pair of projecting elements and cooperating with the hook on the base, and other means for clamping the opposite end of the band with the other side of the base, said means comprising a threaded member having its head portion seated within a depression in the base, and an adjustable nut cooperating with said threaded part for tightly drawing the band around the column.

In testimony whereof I hereunto affix my signature in the presence of two witnesses.

JOHN W. SWAN.

Witnesses:
  Jas. Perriro,
  H. E. Squire.